(12) United States Patent
Lee et al.

(10) Patent No.: US 7,825,926 B2
(45) Date of Patent: Nov. 2, 2010

(54) POINT-BASED RENDERING APPARATUS, METHOD AND MEDIUM

(75) Inventors: Shin-jun Lee, Yongin-si (KR); Gyeong-ja Jang, Yongin-si (KR); Seok-yoon Jung, Yongin-si (KR); Alexei Sosnov, Yongin-si (KR); Do-kyoon Kim, Yongin-si (KR); Keun-ho Kim, Yongin-si (KR); Alexander Zhirkov, Moscow (RU); Alexander Parshin, Moscow (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 780 days.

(21) Appl. No.: 11/723,152

(22) Filed: Mar. 16, 2007

(65) Prior Publication Data

US 2007/0216676 A1     Sep. 20, 2007

(30) Foreign Application Priority Data

Mar. 16, 2006  (KR)  ........................ 10-2006-0024267

(51) Int. Cl.
*G06T 15/00* (2006.01)
(52) U.S. Cl. ........................................ 345/419; 382/103
(58) Field of Classification Search ................ 345/419, 345/423; 382/103
See application file for complete search history.

(56) References Cited

U.S. PATENT DOCUMENTS 5,555,352 A * 9/1996 Lucas ........................ 345/423
7,257,237 B1 * 8/2007 Luck et al. .................. 382/103

* cited by examiner

*Primary Examiner*—Phu Nguyen
(74) *Attorney, Agent, or Firm*—Staas & Halsey LLP

(57) ABSTRACT

A point-based rendering apparatus, method and medium. The point-based rendering apparatus includes a projector to project a point model and to generate a plurality of rendered points, a radius calculator to calculate a radius, corresponding to a predetermined resolution of each of the rendered points, and a splat generator to generate at least one of a hemispherical and a spherical splat having the radius of each of the rendered points.

13 Claims, 20 Drawing Sheets
(7 of 20 Drawing Sheet(s) Filed in Color)

POINT-BASED RENDERING APPARATUS, METHOD AND MEDIUM

CROSS-REFERENCE TO RELATED APPLICATIONS

This application claims the benefit of Korean Patent Application No. 10-2006-0024267, filed on Mar. 16, 2006, in the Korean Intellectual Property Office, the disclosure of which is incorporated herein in its entirety by reference.

BACKGROUND

1. Field

One or more embodiments of the present invention relates to splatting, and more particularly, to a point-based apparatus, method and medium for performing rendering of a point model by generating a spherical (or hemi-spherical) splat on each point on which the point model is projected.

2. Description of the Related Art

Rendering of image data generally denotes visualization of the image data.

To render a point model comprising a combination of points and having a 3D shape, a point-based rendering algorithm is used to generate a planar splat such as a square or sphere on each of the points on which the point model is projected, and a polygon-based rendering algorithm is used to appropriately combine a plurality of polygons.

The polygon-based rendering algorithm takes a long time to generate and combine the plurality of polygons. Therefore, if the point model has a large quantity of data or a complex shape, the number of operations for generating and combining the plurality of polygons is increased, which reduces rendering speed.

According to the point-based rendering algorithm, the points on which the point model are projected are arranged closer to a point of view, and planar splats such as a square or circle are generated according to the arrangement of the points. Therefore, pixel information of a splat, which overlaps with another splat, is lost. In this case, a scale effect occurs such that the splats look like scales. The scale effect deteriorates the appearance of the rendered point model. Furthermore, according to the point-based rendering algorithm, when the point of view moves, the points are rearranged and the pixel information of the splat is changed due to lost pixel information. Therefore, image quality of the rendered point model can be greatly deteriorated because of the changing point of view.

FIGS. 1A and 1B are diagrams for explaining problems of the point-based rendering algorithm. Referring to FIG. 1A, (a) shows points (110, 112, 114) on which the point model is projected, (b) shows square splats (120, 122, 124), and (c) shows spherical splats (130, 132, 134). The plane splat 120 (or 130) is a splat of the point 110. The plane splat 122 (or 132) is a splat of the point 112. The plane splat 124 (or 134) is a splat of the point 114. According to the point-based rendering algorithm, pixel information of the splat 122 (or 132) that overlaps another splat 124 (or 134) is lost and the appearance of a rendered point mode is deteriorated as illustrated in FIG. 1A (b) and (c).

Referring to FIG. 1B, at a point of view 140, a splat 134 does not overlap other splats, and pixel information on an upper part of splats 130 and 132 are lost. At a point of view 142, a splat 132 does not overlap other splats, and pixel information on an upper part of a splat 130 and on a lower part of a splat 134 are lost. At a point of view 144, a splat 130 does not overlap other splats, and pixel information on lower parts of splats 132 and 134 are lost. Therefore, image quality of the rendered point model varies according to points of view.

SUMMARY

One or more embodiments of the present invention provide a point-based apparatus for performing rendering of a point model by generating a spherical (or hemi-spherical) splat on each point on which the point model is projected.

One or more embodiments of the present invention also provide a point-based method of performing rendering of a point model by generating a spherical (or hemi-spherical) splat on each point on which the point model is projected.

One or more embodiments of the present invention also provide a computer readable recording medium storing a program for rendering a point model by generating a spherical (or hemi-spherical) splat on each point on which the point model is projected.

Additional aspects and/or advantages of the invention will be set forth in part in the description which follows and, in part, will be apparent from the description, or may be learned by practice of the invention.

To achieve at least the above and/or other aspects and advantages, embodiments of the present invention include a point-based rendering apparatus including a projector to generate a plurality of rendered points, a radius calculator to calculate a radius corresponding to a predetermined resolution of each of the rendered points, and a splat generator to generate at least one of a hemi-spherical and a spherical splat having the radius of each of the rendered points.

To achieve at least the above and/or other aspects and advantages, embodiments of the present invention include a point-based rendering apparatus including a projector to generate a plurality of rendered points, a radius calculator to calculate a volume, corresponding to a predetermined resolution, of each of the rendered points, and a splat generator to generate a three-dimensional splat having the calculated volume of each rendered point.

To achieve at least the above and/or other aspects and advantages, embodiments of the present invention include a point-based rendering method including generating a plurality of rendered points, calculating a radius, corresponding to a predetermined resolution, and generating at least one of a hemi-spherical and a spherical splat having the calculated radius, wherein the calculating and the generating are performed for each of the rendered points.

To achieve at least the above and/or other aspects and advantages, embodiments of the present invention include a point-based rendering apparatus including generating a plurality of rendered points, calculating a volume, corresponding to a predetermined resolution, and generating a three-dimensional splat having the calculated volume wherein the calculating and the generating are performed for each of the rendered points.

To achieve at least the above and/or other aspects and advantages, embodiments of the present invention include a computer readable recording medium having embodied thereon a computer program for executing a point-based rendering method. The method includes generating a plurality of rendered points, calculating a radius, corresponding to a predetermined resolution, and generating hemi-spherical or spherical splat having the calculated radius, wherein the calculating and the generating are performed for each of the rendered points.

BRIEF DESCRIPTION OF THE DRAWINGS

The patent or application file contains at least one drawing executed in color. Copies of this patent or patent application publication with color drawings will be provided by the Office upon request and payment of necessary fee. These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1A:
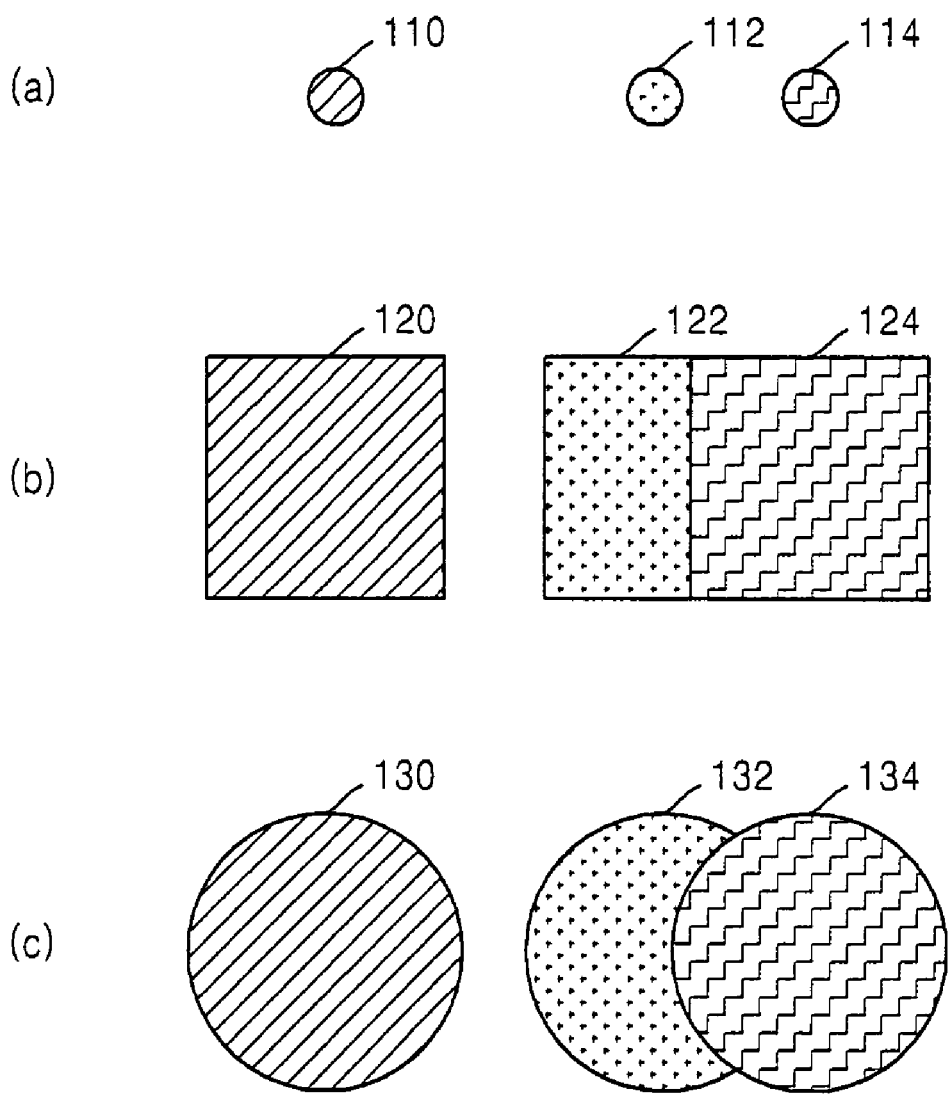
FIGS. 1A and 1B explain problems related to a conventional point-based rendering algorithm.
Figure 1B:
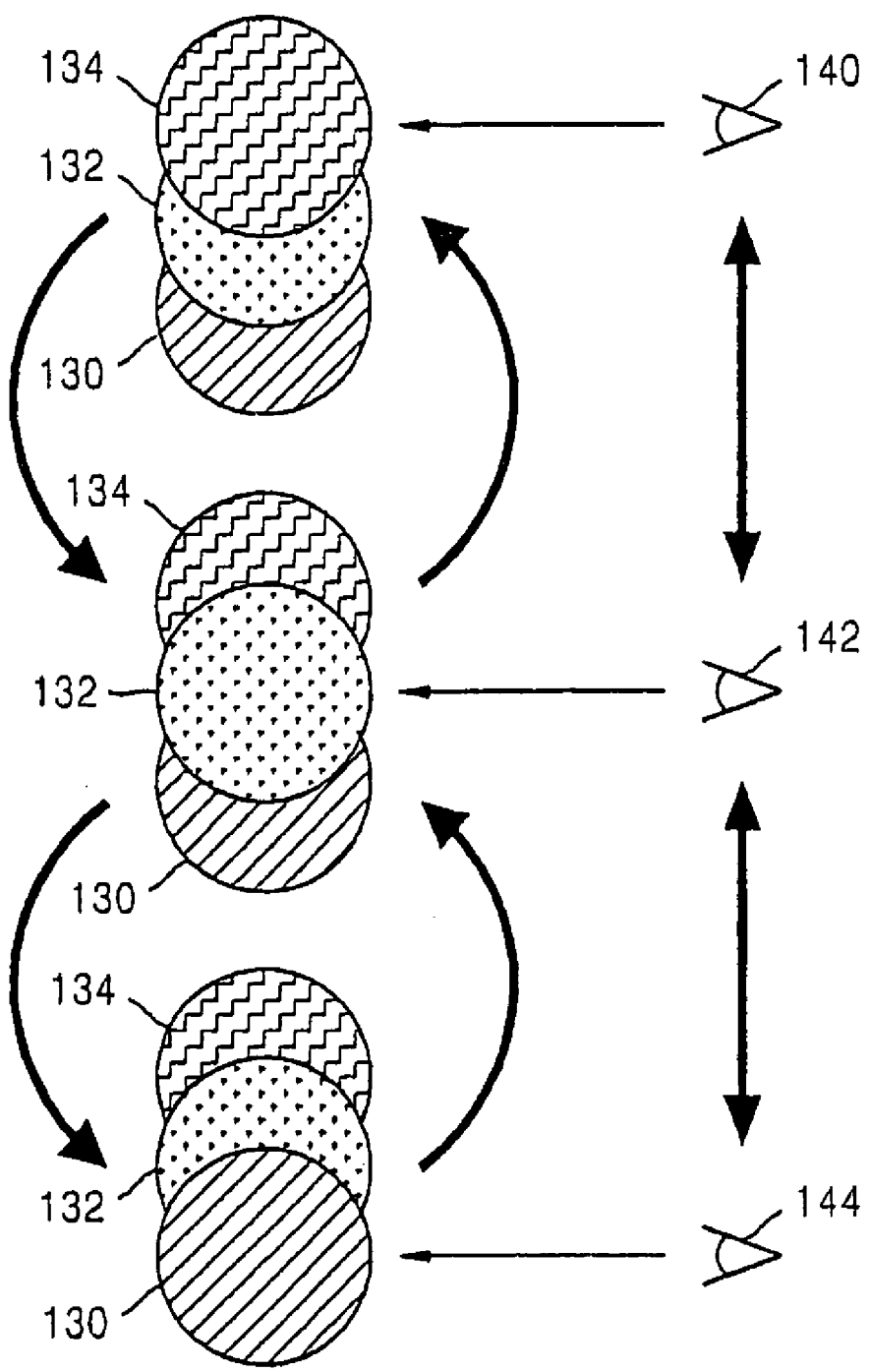

Reference will now be made in detail to embodiments of the present invention, examples of which are illustrated in the accompanying drawings, wherein like reference numerals refer to the like elements throughout. Embodiments are described below to explain the present invention by referring to the figures.

Figure 2:
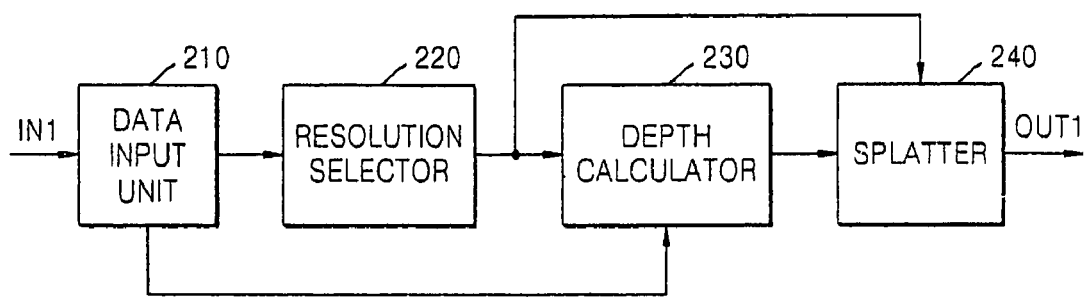
FIG. 2 illustrates a point-based rendering apparatus, according to an embodiment of the present invention.

FIG. 2 illustrates a point-based rendering apparatus, according to an embodiment of the present invention. Referring to FIG. 2, the point-based rendering apparatus may include, for example, a data input unit 210, a resolution selector 220, a depth calculator 230, and a splatter 240.

The data input unit 210 may input a point model, including a combination of points, through an input terminal IN 1. The point model, according to one or more embodiments of the present invention is an example of image data, and further is an example of image data rendered to visualize the image data. The points making up the point model may be referred to as image points. An image point may have 3D data so that the point model may have a 3D shape. The image point may have various data formats. For example, the image point may have a simple texture (ST) data format, a point cloud (PC) data format, or other data format. The ST format may express data of the image point as color information and depth information. The depth information may indicate information regarding distances between a point of view and each image point. The PC format may express data of the image points as color information and geometrical information, for example. The color information may indicate information regarding the color of each of the image points. The geometrical information may indicate locations of each of the image points.

A data format of the image point may include the PC format. Therefore, when the image point is not in the PC format, the data input unit 210 may convert the image point into the PC format. To this end, the data input unit 210 may check if the data format of the input image point is in the PC format and may convert it into the PC format if necessary. If the data format of the input image point is in the PC format, the data input unit 210 may output the input image point as it is.

The resolution selector 220 may select a resolution of the image point among available resolutions. The resolution selector 220 may select the resolution of the image point by a depth of an image point, for example. The depth of an image point generally indicates a distance between a point of view and the image point. For example, if available resolutions have four levels of detail (LODs) 1 through 4, the resolution selector 220 may select LOD 1 when the depth of the image point is between 0 and 25, LOD 2 when the depth of the image point is between 25 and 50, LOD 3 when the depth of the image point is between 50 and 75, and LOD 4 when the depth of the image point is between 75 and 100. The resolution may be set as LOD 1>LOD 2>LOD 3>LOD 4. The image point with a depth of 100 is spaced farthest away from the point of view.

The resolution selector 220 may select the resolution of each image point according to points of view. For example, an image point closest to a point of view a may have the highest resolution, whereas an image point farthest from a point of view b can have the lowest resolution.

The depth calculator 230 may calculate a depth of each image point.

The splatter 240 may project a point model on a screen. The splatter 240 may project all image points or some image points including the point model, for example. According to an embodiment of the present invention, the screen is perpendicular to a point of view and is a plane spaced apart from the point of view by a certain distance. A rendered point model including rendered points may be displayed on the screen. A plurality of rendered points may be generated on the screen. That is, the rendered points may result from projecting image points on the screen. Therefore, the image points may have 3D data, whereas the rendered points may have 2D data. The rendered points may include color and location information of the image points. The screen may include a plurality of pixels. A rendered point may be displayed on at least one pixel. When a rendered point is displayed on a pixel, the rendered point may be displayed on all of or part of the pixel. Also, a rendered point or a plurality of rendered points may be displayed on a pixel.

The splatter 240 may perform three-dimensional splatting on each of the rendered points and may output a result obtained by the three-dimensional splatting through an output terminal OUT 1, for example. That is, the splatter 240 may generate a three-dimensional splat on each of the rendered points. The splat may indicate an object generated to enable rendering of a rendered point. Rendering generally denotes visualization. One or more embodiments of the present invention may suggest the use of a three-dimensional splat, in contrast to the conventional point-based rendering algorithm, which uses two-dimensional splats. For descriptive convenience, and as an example only, the present invention suggests a spherical or hemi-spherical splat. Spherical splatting generally indicates generation of a spherical splat. Hemi-spherical splatting generally indicates generation of a hemi-spherical splat.

The operation of the splatter 240 that performs splatting will now be described. To generate a splat of a rendered point A on which an image point B is projected, the splatter 240 may calculate a volume that is inversely proportional to the resolution of the rendered point A and may generate a three-dimensional splat having the calculated volume as the splat of the rendered point A. For example, the splatter may calculate a radius that is inversely proportional to the resolution of the rendered point A, and generate a spherical or hemi-spherical splat having the rendered point as the center and the calculated radius as the splat of the rendered point A. The resolution of the rendered point A may be the resolution of the image point B.

The splat generated by the splatter 240 may be input into a display apparatus having a screen such as a liquid panel through the output terminal OUT 1 and may be displayed.

Figure 3:
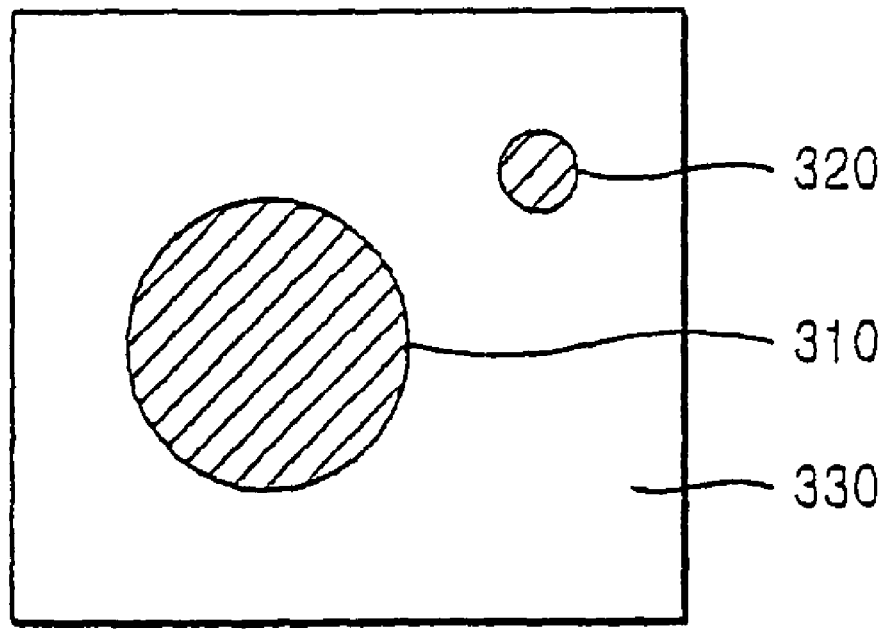
FIG. 3 explains the operation of a resolution selector illustrated in FIG. 2, according to an embodiment of the present invention.

FIG. 3 explains the operation of the resolution selector 220 illustrated in FIG. 2. Referring to FIG. 3, reference numeral 310 or 320 may indicate a result obtained by rendering a point model given to the point-based rendering apparatus of the present invention, e.g., a rendered image, and reference numeral 330 is a screen on which the rendered image may be displayed.

The resolution selector 220 may select the resolution of an image point so that the resolution of the rendered image 310 closer to a point of view is higher than that of the rendered point 320 farther from the point of view, or the resolution of the rendered point 320 farther from the point of view is higher than that of the resolution of the rendered image 310 closer to the point of view.

Figure 4:
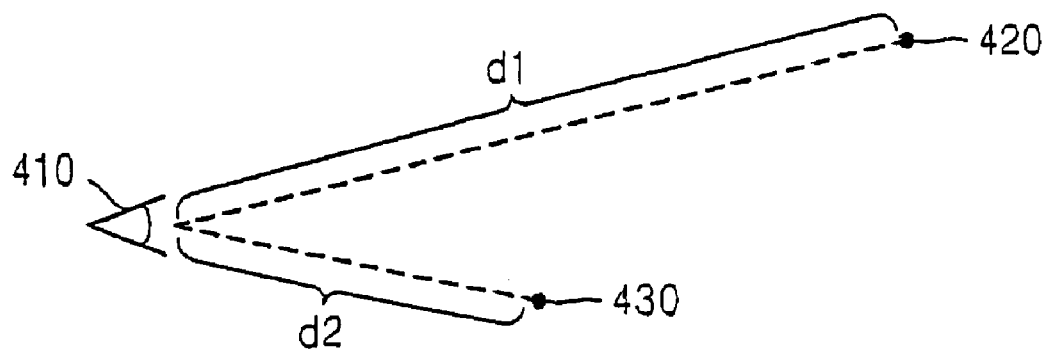
FIG. 4 explains the operation of a depth calculator illustrated in FIG. 2, according to an embodiment of the present invention.

FIG. 4 explains the operation of the depth calculator 230 illustrated in FIG. 2. Referring to FIG. 4, a depth d1 may be a distance between a point of view 410 and an image point 420, and a depth d2 may be a distance between the point of view 410 and an image point 430. The depth calculator 230 may calculate the depths d1 and d2.

Figure 5A:
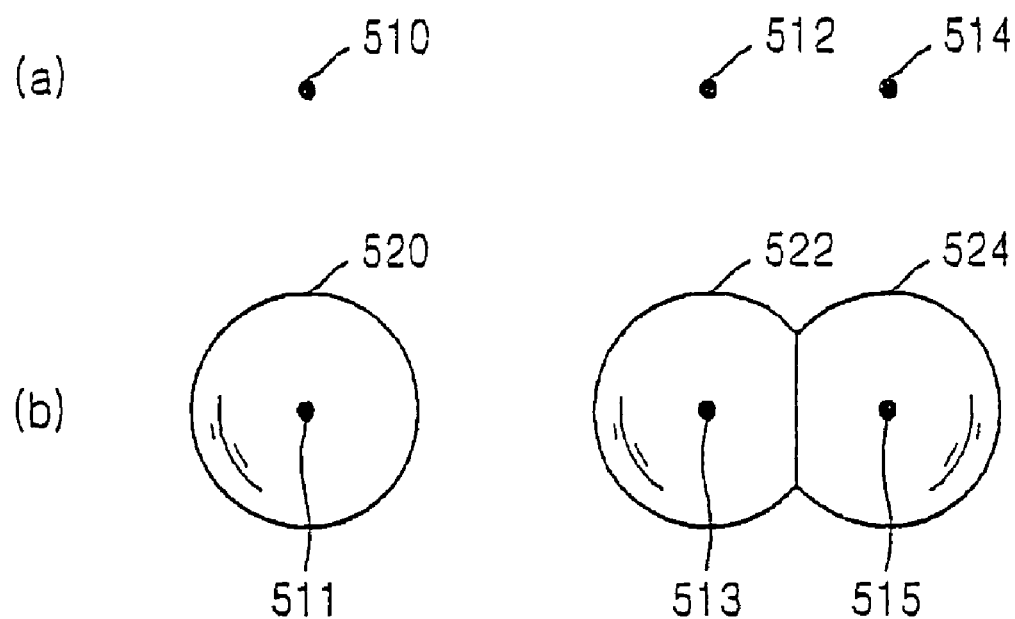
FIGS. 5A and 5B explain the operation of a splatter illustrated in FIG. 2, according to an embodiment of the present invention.
Figure 5B:
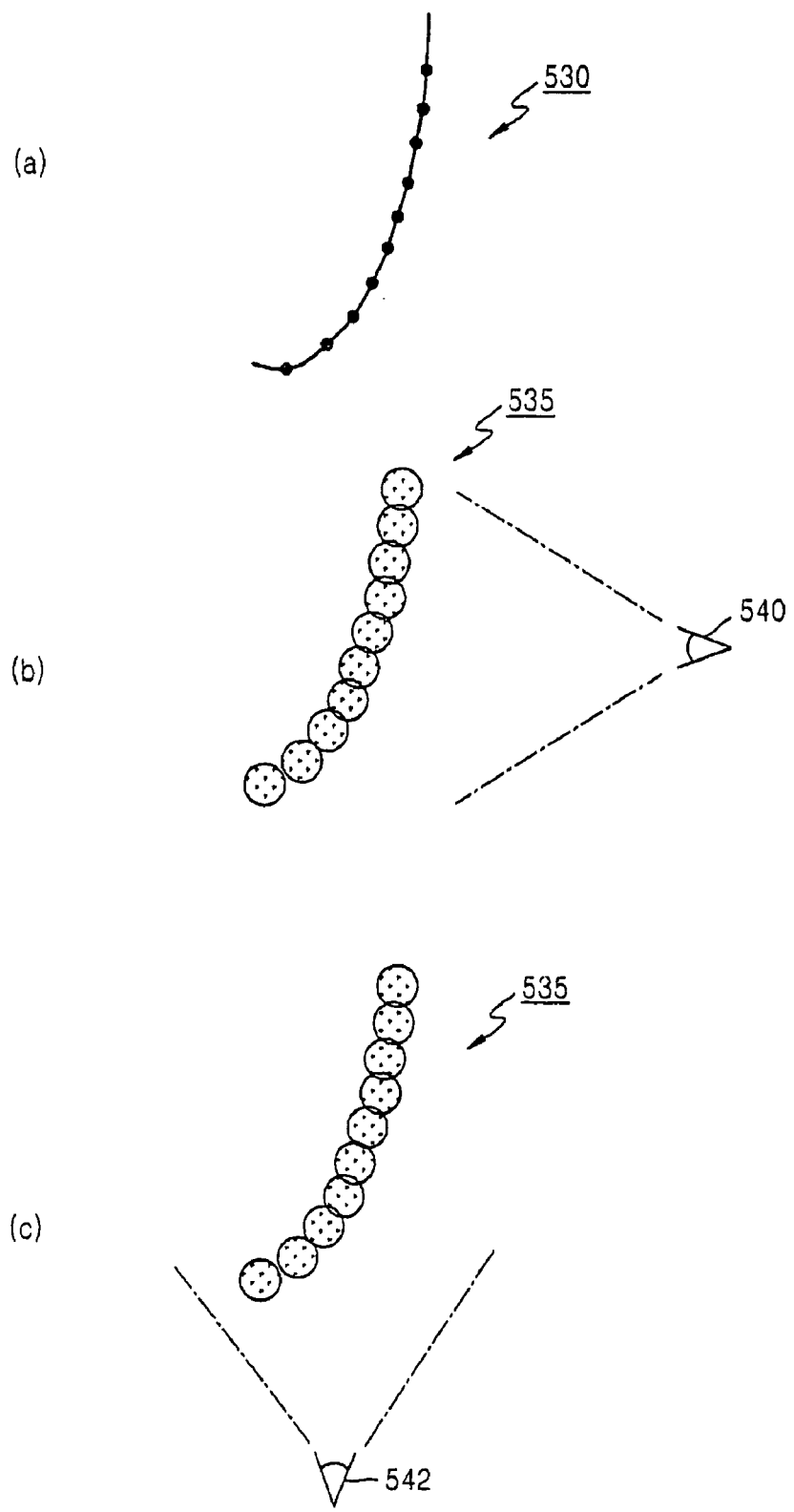

FIGS. 5A and 5B explain the operation of the splatter 240 illustrated in FIG. 2. Referring to FIG. 5A, (a) shows image points 510, 512, and 514, and (b) shows rendered points 511, 513, and 515 and splats 520, 522, and 524 of each of the rendered points 511, 513, and 515.

The rendered points 511, 513, and 515 are results obtained by projecting the image points 510, 512, and 514, respectively.

The splatter 240 may generate the spherical splats 520, 522, and 524 for each of the rendered points 511, 513, and 515, respectively. If the splats 522 and 524 overlap, the splatter 240 may remove an overlapping part of the splat 524 from the splat 522 so that the shape of the spherical splat 522 is updated as illustrated in (b) of FIG. 5A. The splatter 240 may remove an overlapping part of the splat 522 from the splat 524 so that the shape of the spherical splat 524 is updated as illustrated in (b) of FIG. 5A.

Referring to FIG. 5B, (a) shows a point model 530, (b) shows a rendered image 535 and a point of view 540, and (c) shows the rendered image 535 and a point of view 542. The rendered image 535 may be a result obtained by rendering the point model 530. More specifically, the rendered image 535 may be a result obtained by generating a spherical splat for each of rendered points on which each of the image points including the point model 530 is projected, for example.

When the conventional point-based rendering algorithm is used, an image quality may vary according to a point of view, since an overlapping part of a splat varies according to the point of view. However, since the splatter 240 may generate a spherical or hemi-spherical splat, quality of the rendered image 535 need not vary according to the point of view. That is, although the point of view 540 is changed to the point of view 542, as illustrated in FIG. 5B (b) and (c), the quality of the rendered image 535 need not vary.

Figure 6:
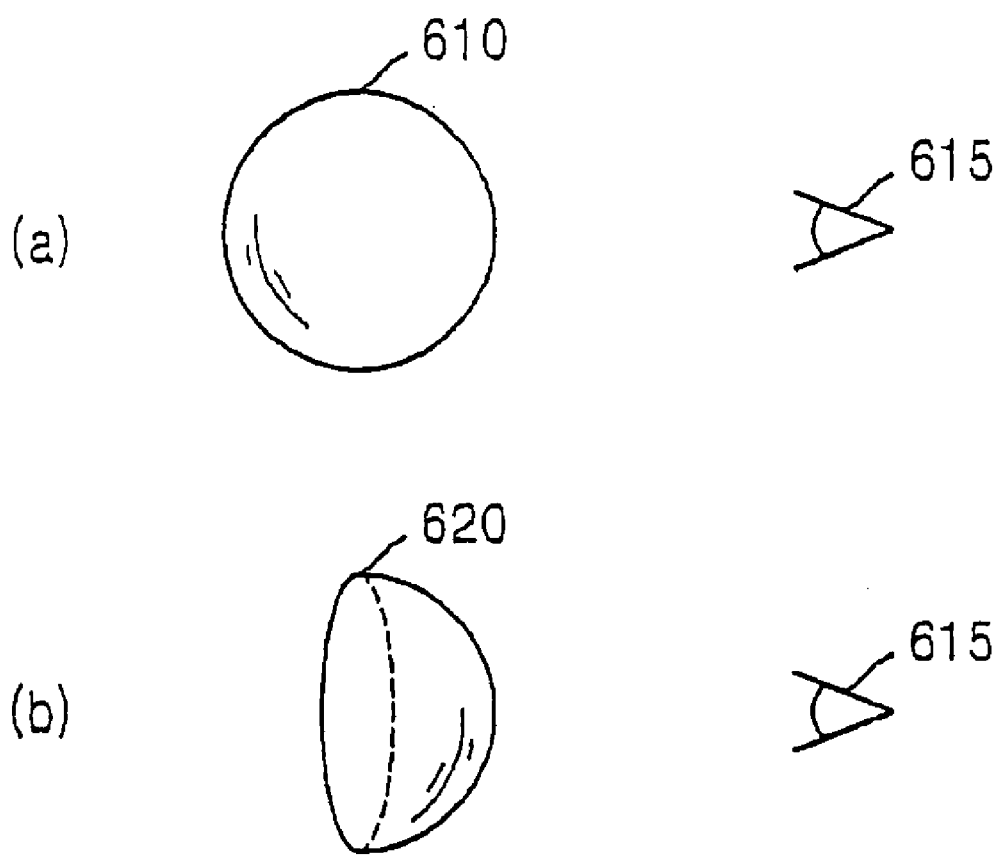
FIGS. 6A and 6B explain a spherical splat and a hemispherical splat that may be realized according to an embodiment of the present invention.

FIG. 6 explains a spherical splat and a hemi-spherical splat that may be realized according to an embodiment of the present invention. Referring to FIG. 6, splats 610 and 620 may appear to be spherical when observed from a point of view 615, even though the splat 610 is spherical or the splat 620 is hemi-spherical.

Figure 7:
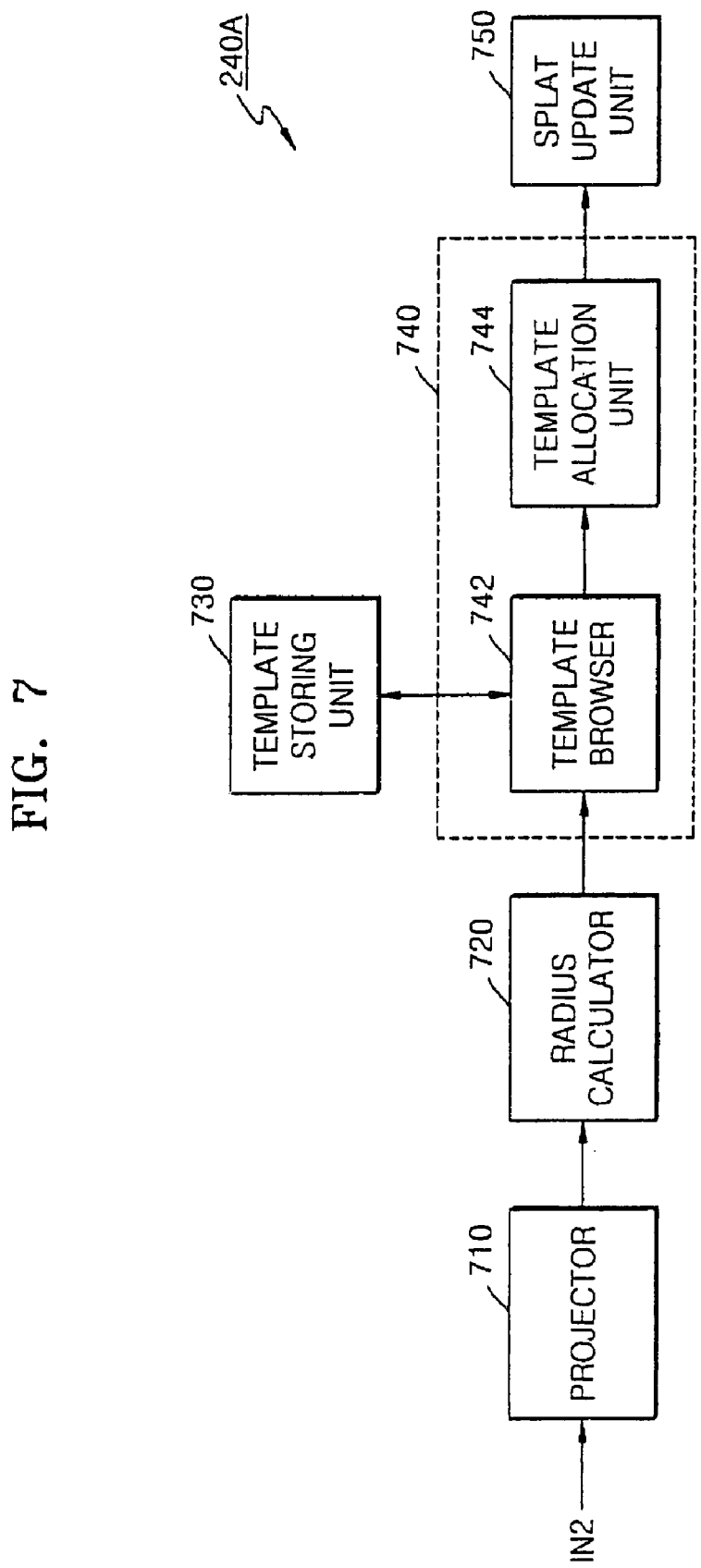
FIG. 7 is a block diagram of the splatter illustrated in FIG. 2, according to an embodiment of the present invention.

FIG. 7 is a block diagram of the splatter 240 illustrated in FIG. 2, according to an embodiment of the present invention. Referring to FIG. 7, the splatter 240 may include, for example, a projector 710, a radius calculator 720, a template storing unit 730, a splat generator 740, and a splat update unit 750.

The projector 710 may project a point model received through an input terminal IN 2 and generate a plurality of rendered points. The input terminal IN 2 may correspond to the input terminal IN 1 of FIG. 2.

The radius calculator 720 may calculate a radius corresponding to a predetermined resolution of each of the rendered points. More specifically, the radius calculator 720 may calculate a radius that is inversely proportional to the predetermined resolution of each rendered point. The predetermined resolution of each rendered point may be a predetermined resolution of an image point corresponding to each rendered point according to a point of view and depth of the image point as described above. The predetermined resolution of each of the rendered points may be the resolution selected by the resolution selector 220 illustrated in FIG. 2.

The template storing unit 730 may store a template at an address corresponding to a radius. The template may be an object for realizing a splat. The template may correspond to a certain number of sub-pixels in a screen. The sub-pixel may be a pixel or an area smaller than a pixel. Each sub-pixel included in the template may include pixel information. The pixel information may include information on a color and depth of each sub-pixel.

The splat generator 740 may generate a hemi-spherical or spherical splat having the center as a rendered point and the radius calculated by the radius calculator 720 for each of the rendered points. The splat generator 740 may include a template browser 742 and a template allocation unit 744, for example. The template browser 742 may browse a template, stored in the template storing unit 730, and may have the radius calculated by the radius calculator 720 as the address. The template allocation unit 744 may output the browsed template as splat of the rendered point.

When the splats generated by the splat generator 740 overlap, the splat update unit 750 may remove an overlapping part of a splat from another splat and update the shape of the splats.

Figure 8:
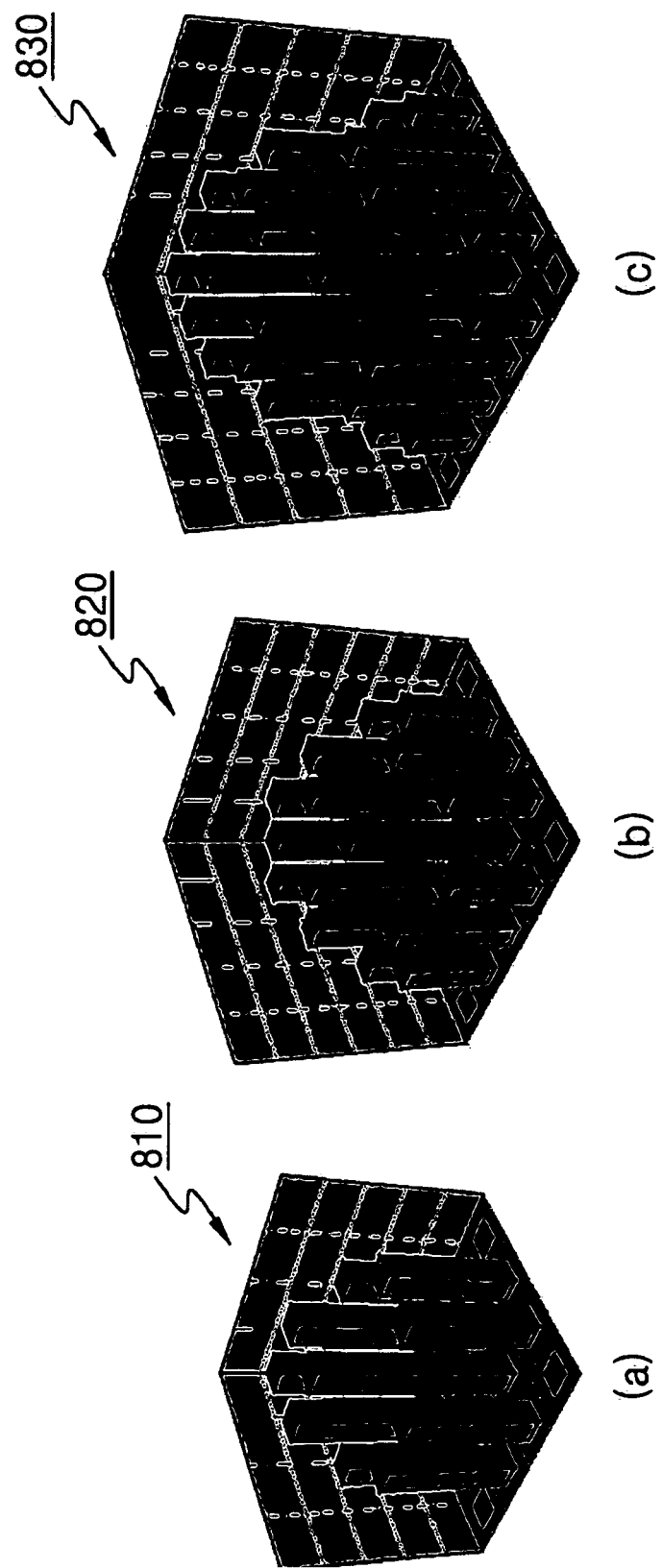
FIGS. 8A, 8B, and 8C explain templates, according to an embodiment of the present invention.

FIGS. 8A, 8B, and 8C explain templates 810, 820, and 830, according to an embodiment of the present invention. The templates 810, 820, and 830 may be realized when a splat is hemi-spherical. Referring to FIG. 8A, the template 810 may be realized when the hemi-spherical splat has a radius of 2 (no unit). Referring to FIG. 8B, the template 820 may be realized when the hemi-spherical splat has a radius of 2.5. Referring to FIG. 8C, the template 830 may be realized when the hemi-spherical splat has a radius of 3.

The template 810 may include 16 sub-pixels on a screen. Each of the 16 sub-pixels may include information on a depth of each pixel. For example, since the splat is hemi-spherical, the depth of one of the 16 sub-pixels at a corner of the template 810 may be 0 (no unit). Four sub-pixels in the center of the 16 sub-pixels may have the greatest depth. Information on a depth of a sub-pixel in the center of the four sub-pixels may be information on a depth of an image point corresponding to the rendered point. Information on colors of sub-pixels having the depth information among the 16 sub-pixels included in the template 810 may be identical to information on a color of the rendered point.

The template 820 may include 25 sub-pixels on the screen, for example. The depth of one of the 25 sub-pixels at a corner of the template 820 may be 0 (no unit). A sub-pixel in the center of the 25 sub-pixels may have the greatest depth. Information on a depth of the center sub-pixel may be information on a depth of an image point corresponding to the rendered point. Information on colors of sub-pixels having the depth information among the 25 sub-pixels included in the template 820 may be identical to information on the color of the rendered point.

The template 830 may include, for example, 36 sub-pixels on the screen. The depth of one of the 36 sub-pixels at a corner of the template 830 may be 0 (no unit). Four sub-pixels in the center of the 36 sub-pixels may have the biggest depth. Information on a depth of a sub-pixel in the center of the four sub-pixels may be information on a depth of an image point corresponding to the rendered point. Information on colors of sub-pixels having the depth information among the 36 sub-pixels included in the template 830 may be identical to information on a color of the rendered point.

Figure 9:
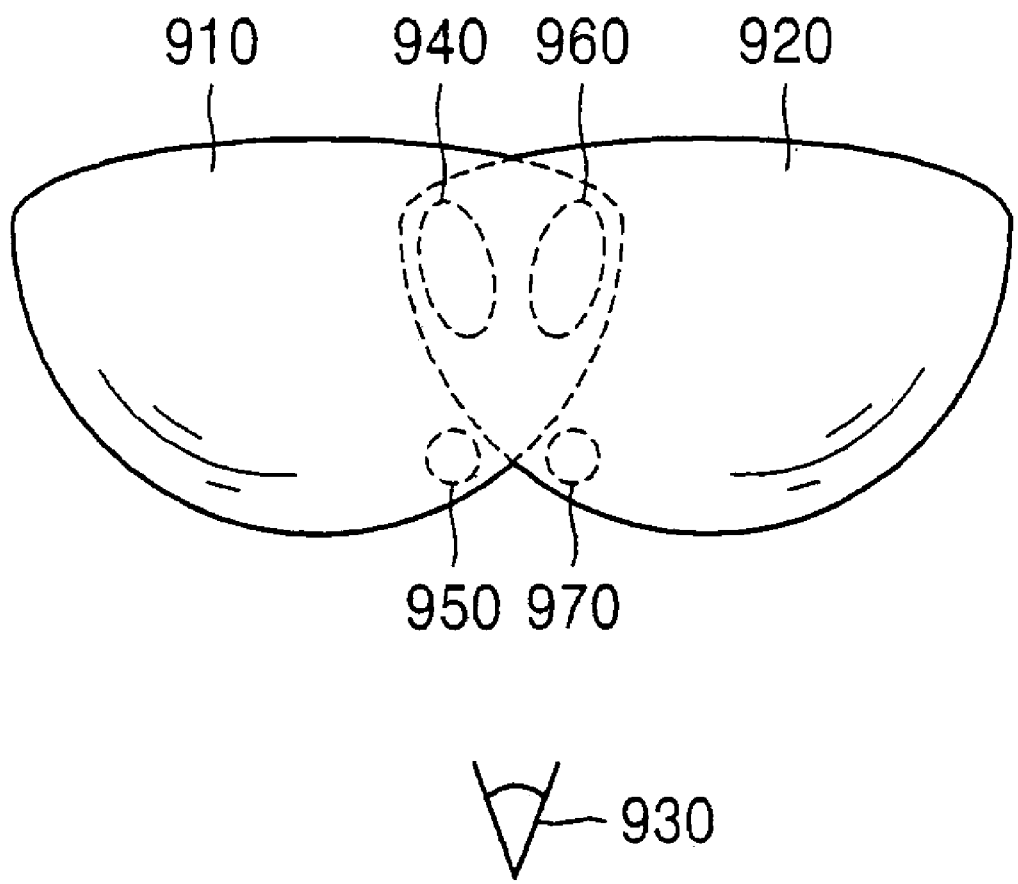
FIG. 9 explains the operation of a splat update unit illustrated in FIG. 7, according to an embodiment of the present invention.

FIG. 9 explains the operation of the splat update unit 750 illustrated in FIG. 7. Referring to FIG. 9, when splats 910 and 920 overlap, the splat update unit 750 may remove an overlapping part of the splat 920 from the splat 910 and it also may remove an overlapping part of the splat 910 from the splat 920.

The splat update unit 750 may compare a depth of a part 950 of the splat 910 and a depth of a part 940 of the splat 920 that "are indicated as a sub-pixel on a screen", remove the part 940 with the depth smaller than the depth of the part 950, and update the splat 920. Likewise, the splat update unit 850 may compare a depth of a part 970 of the splat 920 and a depth of a part 960 of the splat 910 that "are indicated as a sub-pixel on a screen", remove the part 960 with the depth smaller than the depth of the part 970, and update the splat 910. The depths of the parts 940, 950, 960, and 970 may be distances between the point of view 930 and each of the parts 940, 950, 960, and 970, for example.

Figure 10:
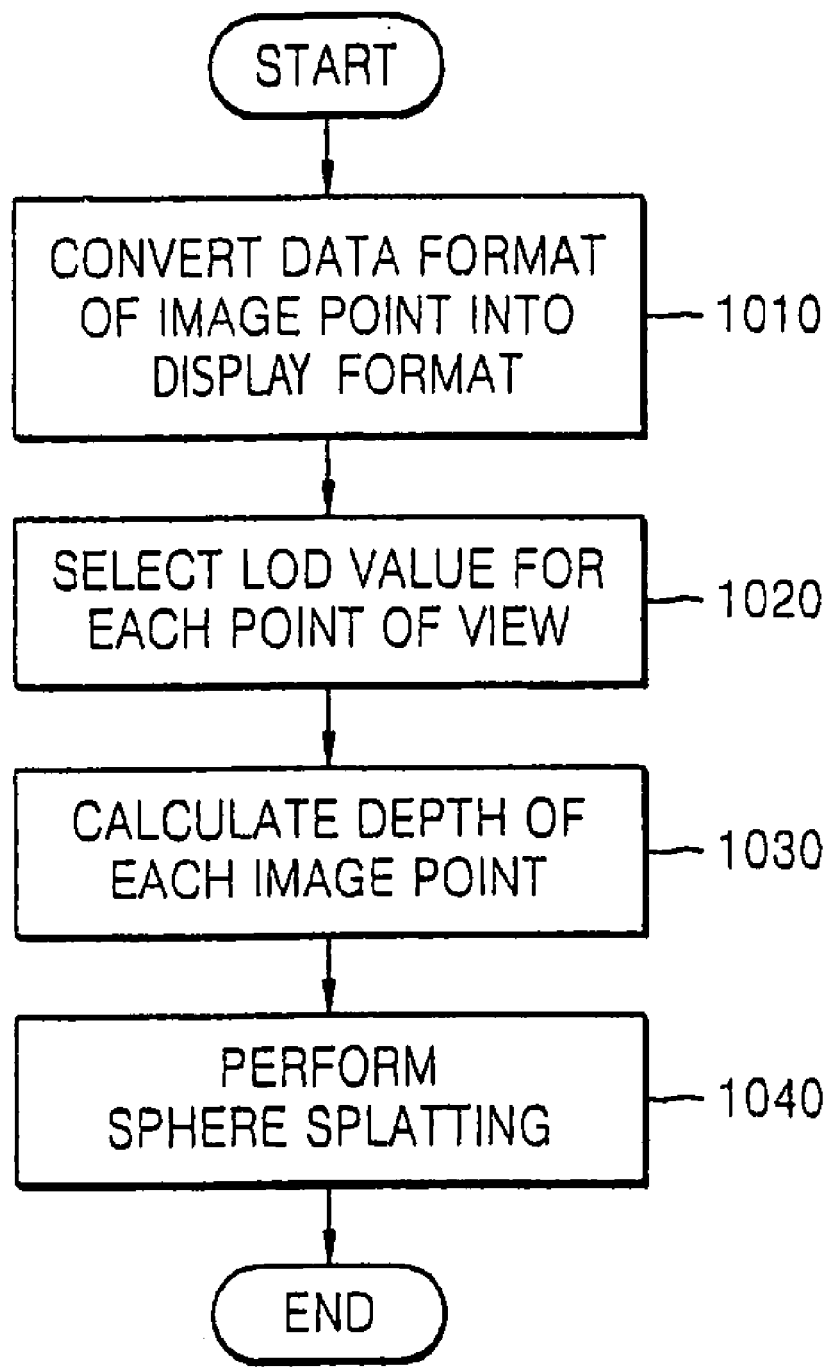
FIG. 10 is a flowchart of a point-based rendering method, according to an embodiment of the present invention.

FIG. 10 is a flowchart of a point-based rendering method, according to an embodiment of the present invention. Referring to FIG. 10, the point-based rendering method may include selecting resolutions according to points of view and depths of image points, calculating a depth of each image point, and generating a three-dimensional splat (e.g., in operations 1010 to 1040).

If a data format of the image points is not a PC format, the data format of the image points may be converted into the PC format, in operation 1010 (e.g., by the data input unit 210).

Resolutions may be selected according to points of view and depths of the image points, in operation 1020 (e.g., by the resolution selector 220). A depth of each of the image points may be calculated, in operation 1030 (e.g., by the depth calculator 230).

A hemi-spherical or spherical splat may be generated for each rendered point on which a point model is projected, in operation 1040 (e.g., by the splatter 240).

Figure 11:
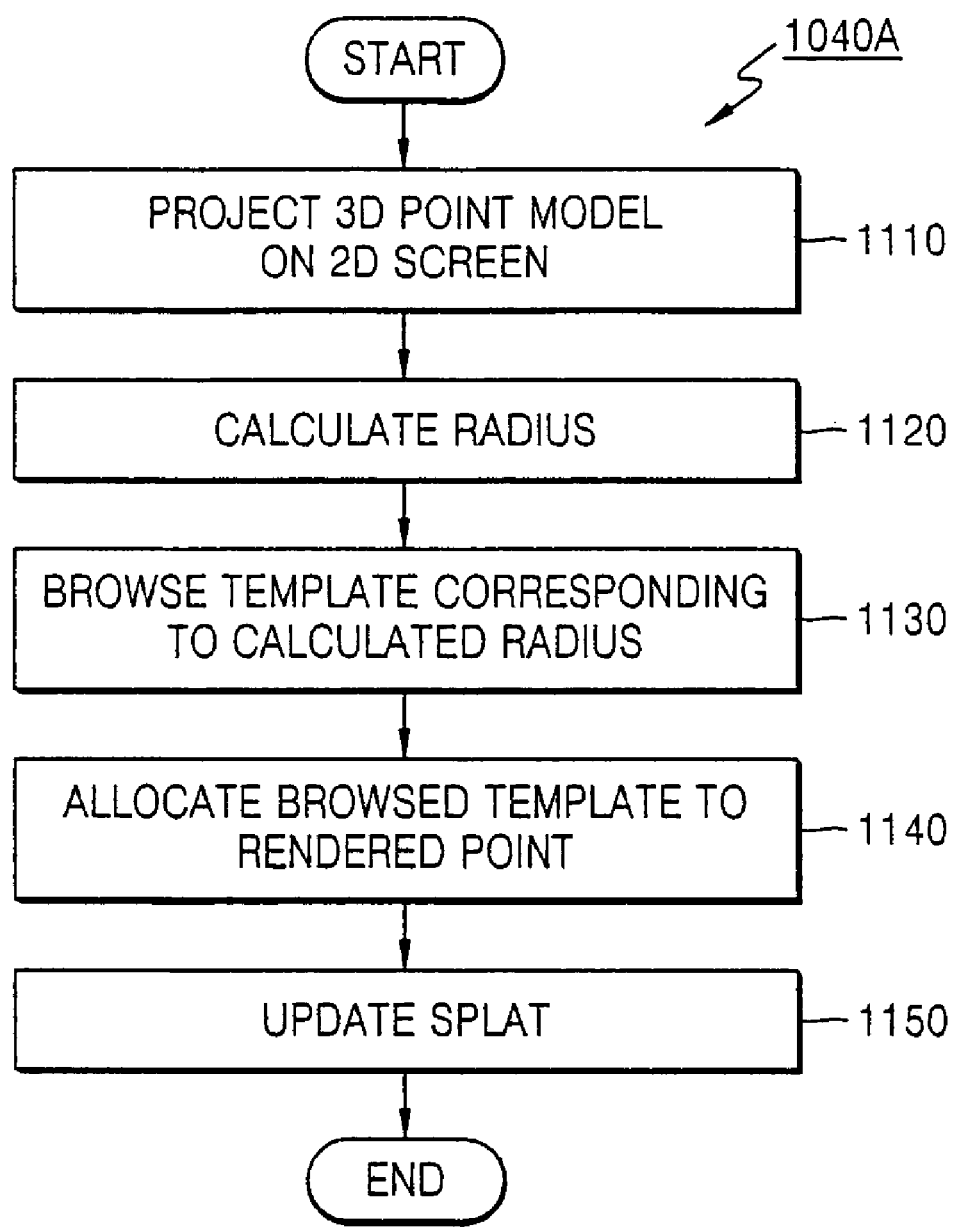
FIG. 11 is a flowchart of Operation 1040 illustrated in FIG. 10, according to an embodiment of the present invention.

FIG. 11 is a flowchart of operation 1040 illustrated in FIG. 10. Referring to FIG. 11, operation 1040 may include rendering the point model (e.g., in operations 1110 to 1150) by generating hemi-spherical or spherical splats.

A plurality of rendered points may be generated by projecting the point model, in operation 1110 (e.g., by the projector 710). A radius may be calculated for each of the rendered points in which the radius is inversely proportional to the resolution selected from operation 1020, in operation 1120 (e.g., by the radius calculator 720).

Templates may be browsed corresponding to the radius calculated in operation 1120 from previously prepared templates, in operation 1130 (e.g., by the template browser 742). The browsed templates may be used as splats for the rendered points, in operation 1140 (e.g., by the template allocation unit 744).

Operations 1120, 1130, and 1140 may be performed on each of the rendered points generated from operation 1110.

When the splats overlap, an overlapping part of a splat may be removed from another splat, and the shape of the splat may be updated for each overlapping splat, in operation 1150 (e.g., by the splat update unit 750).

Figure 12:
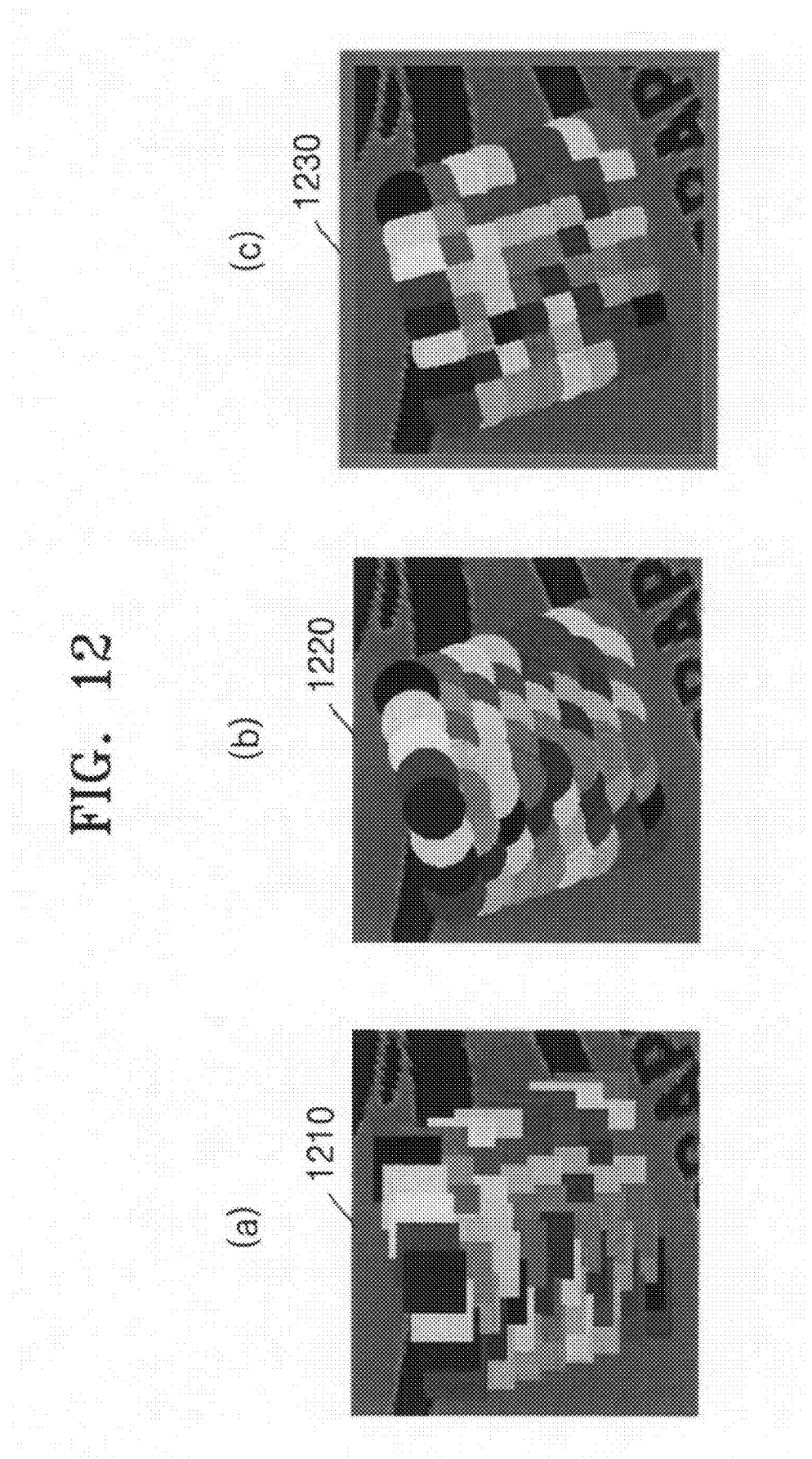
FIGS. 12A, 12B, and 12C explain the effect of the point-based rendering apparatus, method and medium, according to an embodiment of the present invention.

FIGS. 12A, 12B, and 12C explain the effect of the point-based rendering apparatus, method and medium, according to an embodiment of the present invention. More specifically, FIG. 12A shows an image 1210 rendered by the conventional point-based rendering algorithm that may generate a square plane splat. FIG. 12B shows an image 1220 rendered by the conventional point-based rendering algorithm that may generate a circular plane splat. FIG. 12C shows an image 130 rendered by the point-based rendering apparatus of the present embodiment that may generate a spherical or hemi-spherical three-dimensional splat. A scale effect may be removed and image quality may be improved in ascending order of the rendered images 1210, 1220, and 1230.

Figure 13:
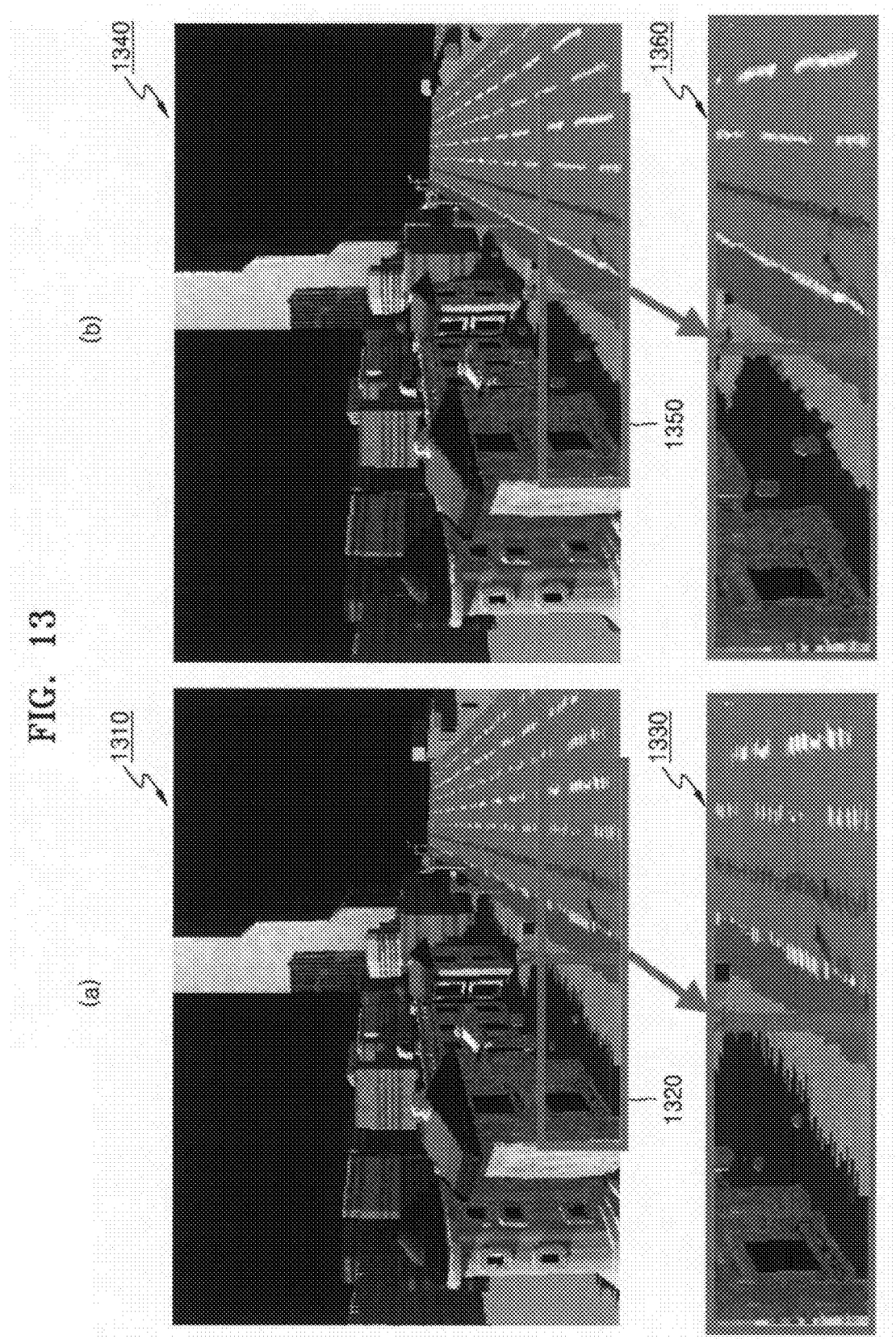
FIGS. 13A and 13B explain an effect of the point-based rendering apparatus, method and medium, according to another embodiment of the present invention.

FIGS. 13A and 13B explain the effect of the point-based rendering apparatus, method and medium, according to another embodiment of the present invention. More specifically, FIG. 13A shows an image 1310 rendered by the conventional point-based rendering algorithm that generates a square plane splat and an image 1330 obtained by expanding an image 1320, which is a part of the image 1310. FIG. 12B shows an image 1340 rendered by the point-based rendering algorithm of the present embodiment that may generate a spherical or hemi-spherical three-dimensional splat and an image 1360 obtained by expanding an image 1350, which is a part of the image 1340. A scale effect may be removed and image quality may be improved in ascending order of the images of FIGS. 13A and 13B.

Figure 14:
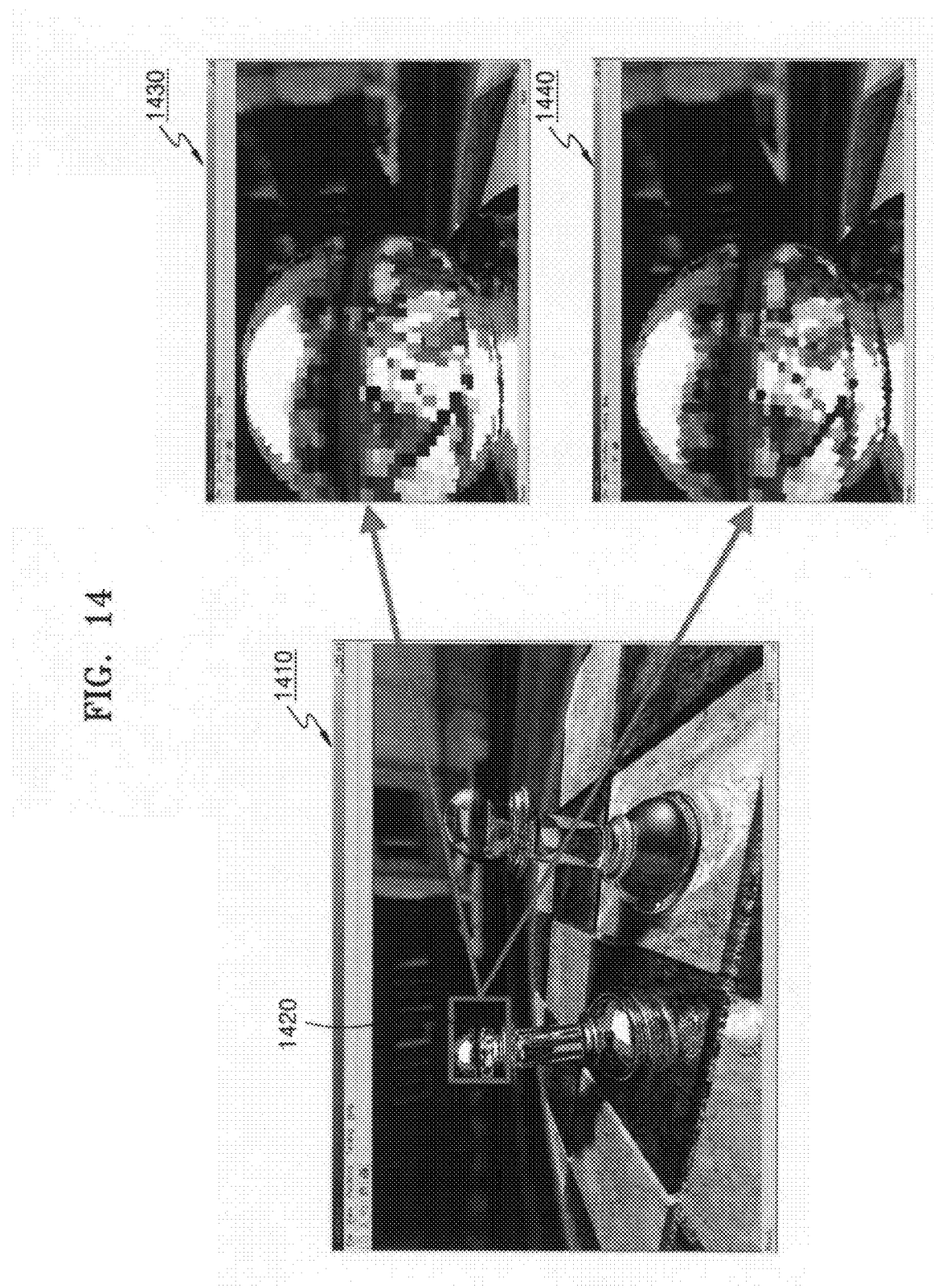
FIG. 14 explain an effect of the point-based rendering apparatus, method and medium, according to another embodiment of the present invention.

FIG. 14 is a diagram for explaining the effect of the point-based rendering apparatus, method and medium, according to another embodiment of the present invention. Referring to FIG. 14, reference numeral 1410 indicates an image including a point model, e.g., a 3D image to be rendered. Reference numeral 1430 indicates an image obtained by rendering the 3D image 1410 and a partial image 1420 of the 3D image 1410 using the conventional point-based rendering algorithm that generates a square plane splat. Reference numeral 1440 may indicate an image obtained by rendering the 3D image 1410 and the partial image 1420 of the 3D image 1410 using the point-based rendering apparatus of the present embodiment that may generate a spherical or hemi-spherical three-dimensional splat. The image 1440 has a better quality than the image 1430.

Figure 15:
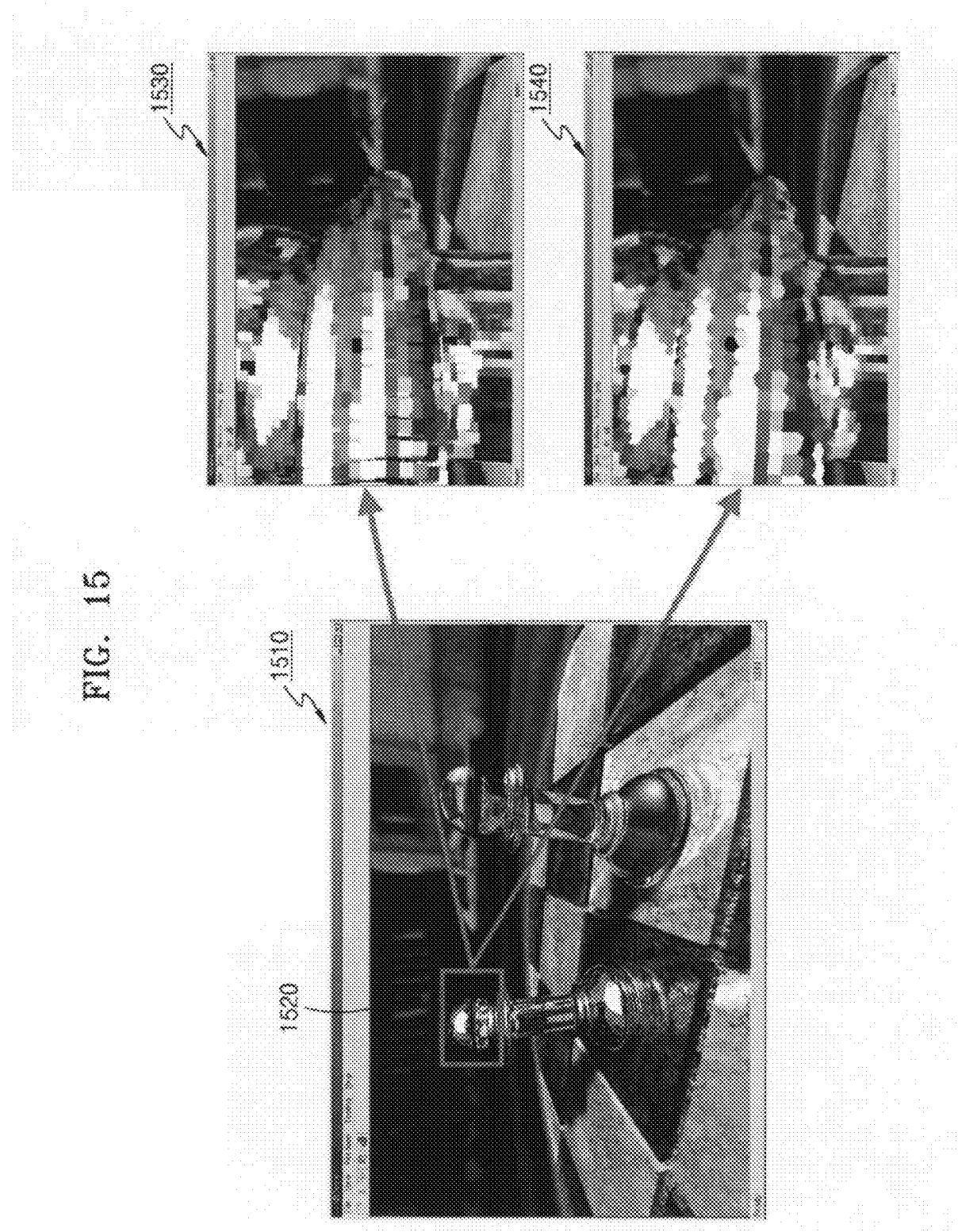
FIG. 15 explain an effect of the point-based rendering apparatus, method and medium, according to another embodiment of the present invention.

FIG. 15 is a diagram for explaining the effect of the point-based rendering apparatus, method and medium, according to another embodiment of the present invention. Referring to FIG. 15, reference numeral 1510 indicates an image including a point model, e.g., a 3D image to be rendered, reference numeral 1530 indicates an image obtained by rendering the 3D image 1510 and a partial image 1520 of the 3D image 1510 using the conventional point-based rendering algorithm that generates a square plane splat, and reference numeral 1540 may indicate an image obtained by rendering the 3D image 1510 and the partial image 1520 of the 3D image 1510 using the point-based rendering apparatus of the present invention that may generate a spherical or hemi-spherical three-dimensional splat. The image 1540 has a better quality than the image 1530.

Figure 16:
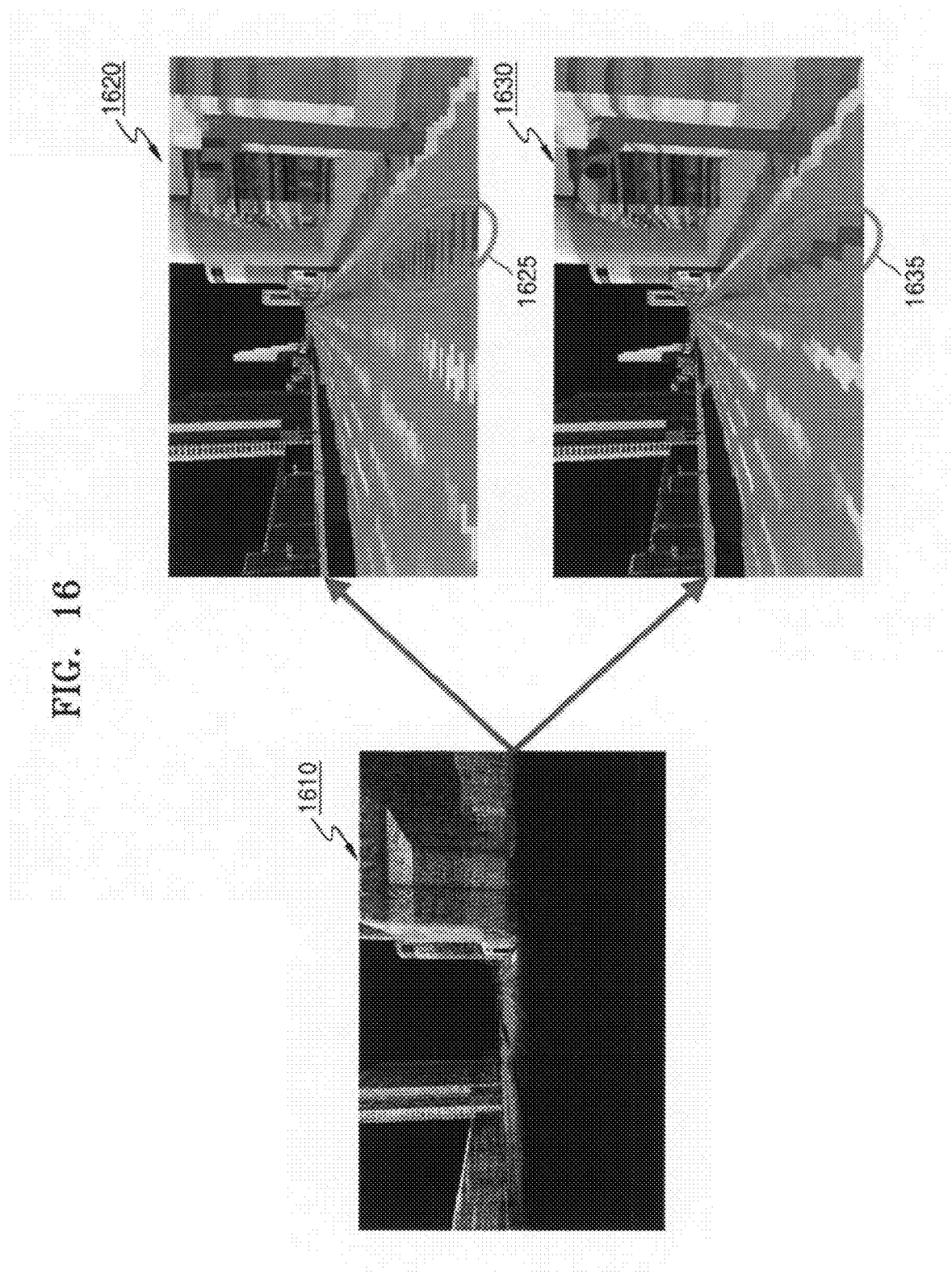
FIG. 16 explain an effect of the point-based rendering apparatus, method and medium, according to another embodiment of the present invention.

FIG. 16 is a diagram for explaining the effect of the point-based rendering apparatus, method and medium, according to another embodiment of the present invention. Referring to FIG. 16, reference numeral 1610 indicates an image including a point model, e.g., a 3D image to be rendered. Reference numeral 1620 indicates an image obtained by rendering the 3D image 1610 using the conventional point-based rendering algorithm that generates a square plane splat. Reference numeral 1630 may indicate an image obtained by rendering the 3D image 1610 using the point-based rendering apparatus of the present embodiment that may generate a spherical or hemi-spherical three-dimensional splat. The image 1630 (in particular, reference numeral 1635) has a better quality than the image 1620 (in particular, e.g., reference numeral 1625).

Figure 17A:
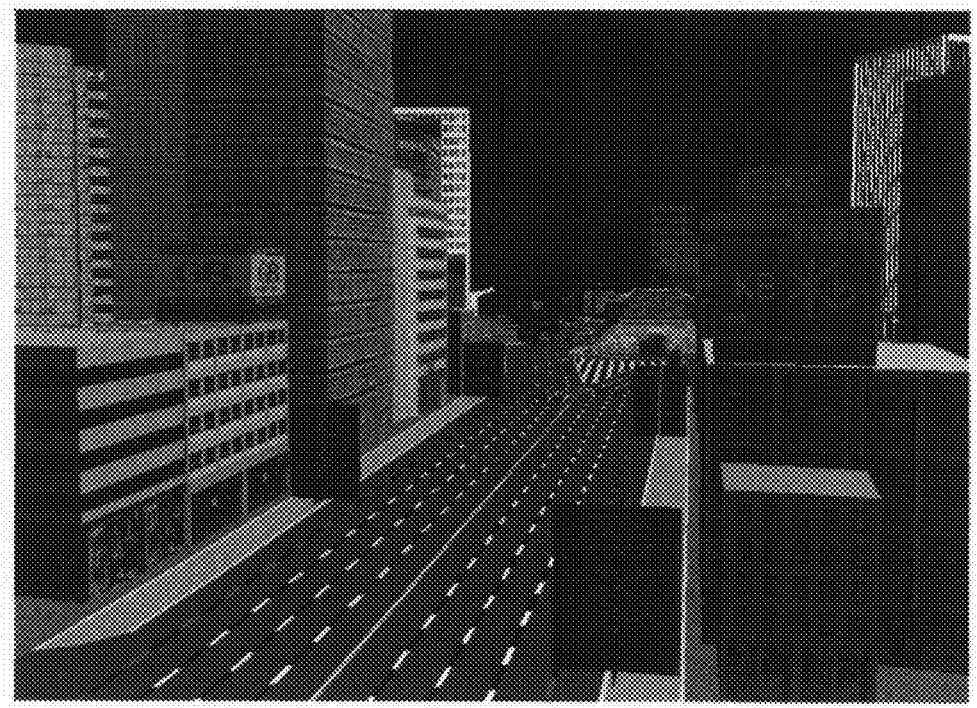
FIGS. 17A, 17B, and 17C explain an effect of the point-based rendering apparatus, method and medium, according to another embodiment of the present invention.
Figure 17B:
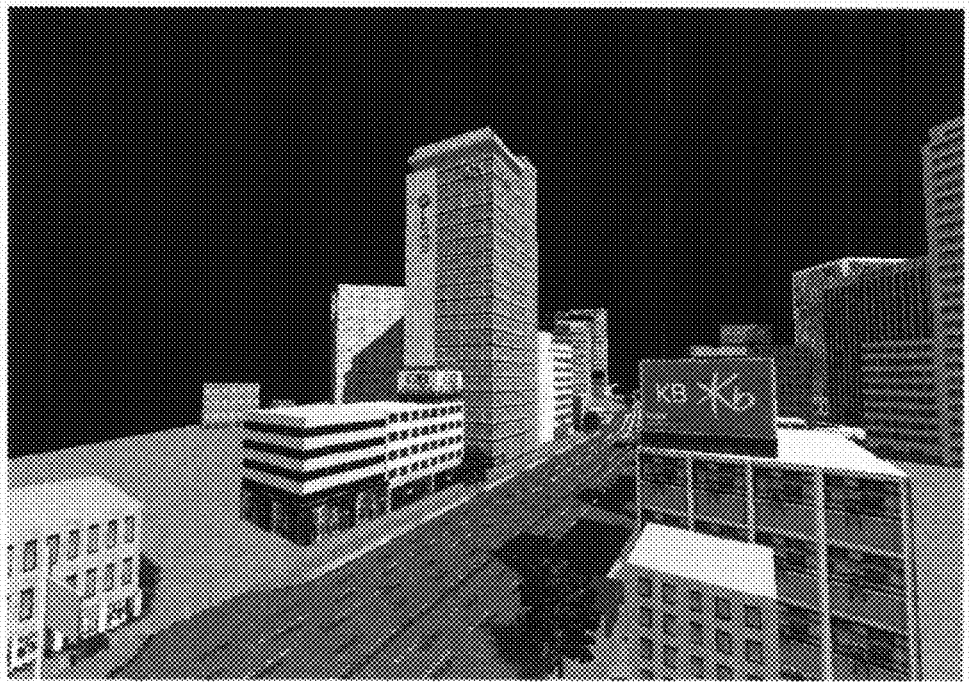
Figure 17C:
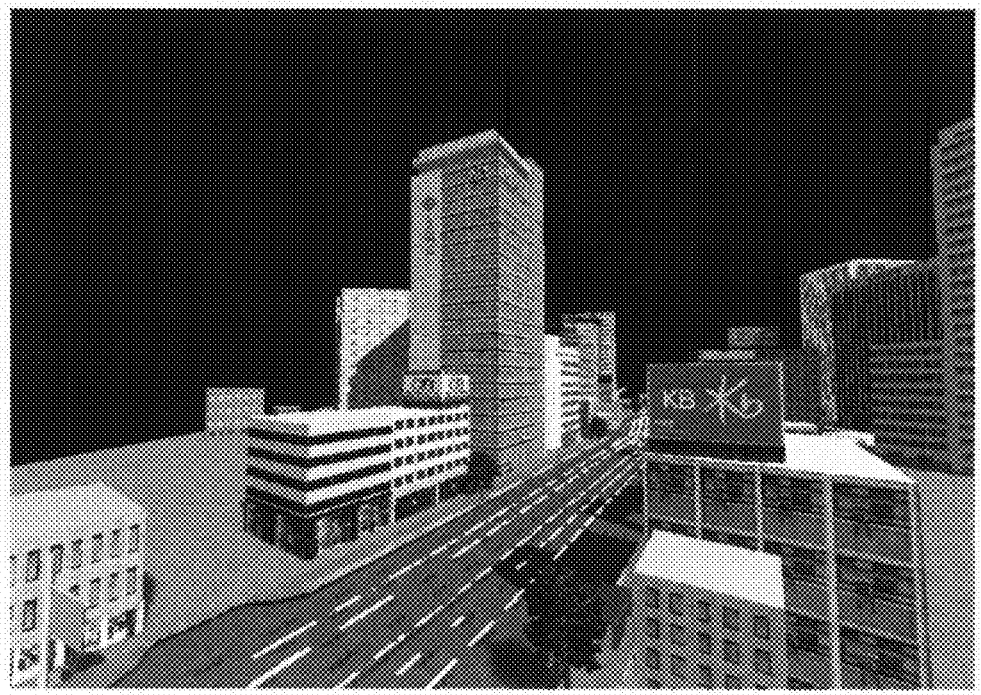

FIGS. 17A, 17B, and 17C are diagrams for explaining the effect of the point-based rendering apparatus, method and medium, according to an embodiment of the present invention. More specifically, FIG. 17A shows a rendered image using the conventional polygon-based rendering algorithm. FIG. 17B shows a rendered image using the conventional point-based rendering algorithm that generates a square plane splat. FIG. 17C shows a rendered image using the point-based rendering apparatus of the present embodiment that may generate a spherical or hemi-spherical three-dimensional splat. The rendered image illustrated in FIG. 17C has a better quality than the rendered images illustrated in FIGS. 17A and 17B.

In addition to this discussion, one or more embodiments of the present invention may also be implemented through such software as computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including magnetic storage media (e.g., ROM, floppy disks, hard disks, etc.), and optical recording media (e.g., CD-ROMs, or DVDs). The media may also be a distributed network, so that the computer readable code is stored/transferred and executed in a distributed fashion. Still further, as only an example, the processing element may include a processor or a computer processor, and processing elements may be distributed and/or included in a single device.

According to the point-based rendering apparatus, method and medium of the present invention, a point model may be rendered by generating a spherical (or hemi-spherical) splat of each point on which the point model is projected, which averts a scale effect that is a problem of conventional point-based rendering algorithms using plane splatting, thereby improving quality of a rendered image. In contrast with the conventional point-based rendering algorithm using plane splatting, owing to the spherical (or hemi-spherical) splat, a rendered result need not be influenced by points of view and thus the rendered image may have a uniform quality although points of view vary. Furthermore, the rendered image may be generated using a splat having a radius corresponding to a predetermined resolution, so that rendering is quickly performed, unlike the conventional point-based rendering algorithm that may generate the rendered image by appropriately combining a plurality of polygons.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A point-based rendering apparatus comprising:
   a projector to generate a plurality of rendered points by projecting a point model;
   a radius calculator to calculate a radius corresponding to a predetermined resolution of each of the plurality of rendered points; and
   a splat generator to generate a hemi-spherical or spherical splat having the radius of each of the plurality of rendered points.

2. The apparatus of claim 1, further comprising a splat update unit to update the splat by removing an overlapping part of another splat from the splat.

3. The apparatus of claim 1, wherein the splat generator comprises:
   a template storing unit to store templates at an address corresponding to a radius;
   a template browser to browse templates having the address corresponding to the radius calculated by the radius calculator from the templates stored in the template storing unit; and
   a template allocation unit to output the browsed template as the splat.

4. The apparatus of claim 1, further comprising: a depth calculator to calculate a depth of each image point comprising the point model,
   wherein the radius calculator calculates the radius corresponding to a predetermined resolution according to a depth.

5. The apparatus of claim 4, wherein the radius calculator calculates the radius corresponding to a predetermined resolution according to point of view and a depth.

6. The apparatus of claim 4, wherein the radius calculator calculates the radius to be inversely proportional to the predetermined resolution of each rendered point.

7. A point-based rendering apparatus comprising:
a projector to generate a plurality of rendered points by projecting a point model; and
a splatter to calculate a volume, corresponding to a predetermined resolution, of each of the plurality of rendered points
and to generate a three-dimensional splat having the calculated volume of each of the plurality of rendered points.

8. A point-based rendering method comprising:
generating a plurality of rendered points by projecting a point model;
calculating, performed in a processor, a radius, corresponding to a predetermined resolution of each of the plurality of rendered points; and
generating a hemi-spherical or spherical splat having the calculated radius of each of the plurality of rendered points.

9. The method of claim 8, further comprising updating the splat by removing an overlapping part of another splat from the splat.

10. The method of claim 9, wherein the updating comprises:
determining whether a first pixel of a first splat and a second pixel of a second splat are displayed on an area;
if it is determined that the first pixel of the first splat and the second pixel of the second splat are displayed on the area, determining whether a depth of the first pixel of the first splat is bigger than that of the second pixel of the second splat; and
if it is determined that the depth of the first pixel of the first splat is bigger than that of the second pixel of the second splat, removing information on the first pixel of the first splat.

11. The method of claim 8, wherein the generating comprises:
browsing a template corresponding to the calculated radius from previously prepared templates; and
using the browsed template as the splat.

12. A point-based rendering method comprising:
generating a plurality of rendered points by projecting a point model;
calculating, performed in a processor, a volume, corresponding to a predetermined resolution of each of the plurality of rendered points; and
generating a three-dimensional splat having the calculated volume of each of the plurality of rendered points.

13. A computer readable non-transitory recording medium having embodied thereon a computer program for executing a point-based rendering method, the method comprising:
generating a plurality of rendered points by projecting a point model;
calculating a radius, corresponding to a predetermined resolution of each of the plurality of rendered points; and
generating a hemi-spherical or spherical splat having the calculated radius of each of the plurality of rendered points.

* * * * *